United States Patent [19]

Berlin

[11] Patent Number: 4,496,121
[45] Date of Patent: Jan. 29, 1985

[54] CONTROL SURFACE LOCK FOR FLUTTER CONSTRAINT

[75] Inventor: J. Burton Berlin, Mercer Island, Wash.

[73] Assignee: The Boeing Company, Seattle, Wash.

[21] Appl. No.: 420,725

[22] Filed: Sep. 21, 1982

[51] Int. Cl.³ .................... B64C 13/14; B64C 13/42
[52] U.S. Cl. ............................... 244/75 A; 244/224; 244/78
[58] Field of Search ............... 244/75 R, 75 A, 76 R, 244/78, 220, 221, 224, 226, 90 R, 213; 91/509, 510, 437

[56] References Cited

U.S. PATENT DOCUMENTS

| | | | |
|---|---|---|---|
| 2,664,255 | 12/1953 | Crandall et al. | 244/224 |
| 3,220,317 | 11/1965 | Fuell | 244/78 |
| 3,426,650 | 2/1969 | Jenney | 244/78 |
| 3,477,347 | 11/1969 | Rice | 91/437 |
| 3,943,968 | 3/1976 | Treichler | 244/78 |
| 4,320,691 | 3/1982 | McWilliams | 91/437 |

Primary Examiner—Trygve M. Blix
Assistant Examiner—Rodney Corl
Attorney, Agent, or Firm—Hughes, Barnard & Cassidy

[57] ABSTRACT

A control surface lock (10) for flutter constraint of a control surface (14) of an aircraft in cooperative combination with an hydraulic actuator (12), wherein system pressure on the actuator maintains the lock in a dynamically bypassed configuration and loss of system pressure causes the lock to assume a constraint configuration providing a stiff link with the control surface, is comprised of a locking piston (82) secured to the control surface and disposed for reciprocable movement in a locking cylinder (90) upon actuation of the surface, first and second charged locking chambers (92, 94) within the cylinder disposed for series flow of fluid from one to the other upon movement of the locking piston through a bypass valve (100) biased to an open position and a flow splitter (74) having a parallel flow path from the actuator to serve for fluid exchange; wherein loss of system pressure interrupts the series flow and locks the piston in the constraint configuration for flutter protection of the control surface.

15 Claims, 1 Drawing Figure

CONTROL SURFACE LOCK FOR FLUTTER CONSTRAINT

DESCRIPTION

1. Technical Field

The present invention relates, generally, to locking devices for preventing flutter in a control surface of an aircraft and, more especially, to a control surface lock for flutter constraint redundancy in the event of hydraulic system failure. The control surface lock of the present invention is particularly adapted to constitute a stiff link operating on a control surface in dependence with a first hydraulic actuator for causing movement of that control surface and in semi-independence with a second hydraulic actuator likewise disposed for controlling the movement of the control surface; albeit, the instant lock is equally adaptable for association with other moveable surfaces on an aircraft where limited locking features are necessary or desirable.

2. Background Art

Federal Aviation Requirements ("FAR") are quite stringent respecting devices employed in association with control surfaces of an aircraft. In the context of commercial aircraft, two specific objectives are paramount. First, there often must be provided a plurality of systems in operative engagement with a control surface in order to insure redundancy in the event one system experiences failure. Second, and related to the foregoing, is the demand that these control surfaces be protected against flutter, as may otherwise be experienced should there be an absence of a stiff link between the control surface and apparatus supporting and/or actuating same. A number of proposed approaches to achieve flutter constraint redundancy have been suggested with these objectives in mind.

Currently, many commercial aircraft include mass balance as an avenue for flutter constraint of a control surface. These hinged surfaces are provided with an effective balancing mass ahead of the hinge line for the purpose of retarding flutter which can, without some means of protection, become quite destructive. Mass balance, properly designed, provides adequate protection from flutter and it is most often the case that pairs of independent hydraulic actuators satisfy the control redundancy requirements imposed by FAR. Those hydraulic actuators provide the stiff links with the control surface and, should one or both fail, mass balance remains as a back-up for flutter constraint thereof. While mass balance is a straightforward approach in resolution of this problem, it presents the distinct disadvantage of imposing a large weight penalty required for effective control. For example, for large aircraft, various control surfaces may require between about 100 and 400 pounds of mass balance. Significant weight savings could be achieved, therefore, were there a suitable option to this approach.

Adding yet another actuator units for the sole purpose of relieving the weight imposed by mass balance is not currently a practical solution. Rigging the control surface when associated with but two actuators is already a sometimes tedious chore due to force fighting between the units if synchronization is not achieved within certain tolerances. Adding other actuator units would only serve to exacerbate this problem. Further, addition of a third or fourth hydraulic supply system, when only one or two are required for controllability, constitutes an undesirable complexity.

Dampers have been proposed, and in many instances have been implemented, with an eye toward flutter constraint. However, a single damper is not sufficient for FAR redundancy requirements; necessitating at least two dampers in order to account for potential combinations of failure. And further, in cases where a stiff link to the control surface is a requirement, dampers simply will not suffice.

Turning to the patent art, U.S. Pat. No. 3,119,469 discloses a viscous fluid damper particularly adapted for association with aircraft rudders and/or elevators. This flutter damper is one designed with the added objective of compensating for viscosity changes in the damping fluid resulting from temperature variations experienced during flight conditions. In capsule sum, it includes bi-metallic elements within the damper structure, one having a relatively high coefficient of thermal expansion and the other a relatively low one. In concert, the couple serves to account for problems associated with temperature variation. However, as a damper, neither a stiff link nor a limited locking function can reasonably be achieved. Another type of thermally-responsive damper is disclosed in U.S. Pat. No. 2,087,426. U.S. Pat. No. 2,342,578 suggests still another type of damping device for aircraft control surfaces; where bypass ports are closed in response to piston acceleration in the device. Accordingly, as a variety of damper, this approach suffers the aforenoted limitations.

The British patent art is also replete with damper devices. For example, British Pat. No. 893,884 discloses a flutter damping device for the control surfaces of aircraft. The device includes a four-way servo valve control wherein an orifice-restricted bypass is incorporated to allow damped motion of the control surface in the event of hydraulic failure. Provisions are made for a stationary piston or housing with suitable hydraulic connections so that the bypass is closed when the system is pressurized. British Pat. No. 712,321 is noteworthy, although it too relates to a damper for flutter control. That patent discloses a vane-type rotary damper including replenishing chamber means communicating with working chambers through suitable check valves. British Pat. No. 696,028 is worthy of further comment; albeit the device also resembles a damper in many aspects. The approach suggested there is the cooperative combination of an hydraulic actuator for movement of the control surface coupled to a damping piston carried on an extension of the piston rod of the hydraulic pump. The damping piston is confined within a cylinder charged with pressurized fluid by the same pump supplying the hydraulic actuator. Apart from the normal damping thereby provided, certain failures result in a locking of the surface altogether; for example, in the event of an electrical failure in the hydraulic pump. While providing flutter constraint under such conditions, that is nonetheless a considerable drawback in many situations. For instance, it is desirable to provide the capability of overriding a stiff link of this sort should a backup actuator remain effective, thereby continuing with active control over the control surface while nonetheless maintaining a suitably rigid link for flutter constraint. Another potential problem area as respects the British Pat. No. 696,028 device is its simple recirculation of fluid around the damping piston which can contribute to silting, stagnation of fluid, and the like.

As is apparent from the foregoing, many endeavors toward flutter constraint have approached the solution of the problem through dampers which, is further noted above, do not always meet applicable requirements for flutter constraint and redundancy. Then too, none of the systems noted or discussed above admits of the ready ability to test the system to ascertain whether it is operating properly—there is no reliable yet simple test for determining the operability of dampers employed for flutter constraint, hence the FAR requirement for a multiplicity of same.

Accordingly, the need exists to provide a control surface lock for flutter constraint which is simple and yet highly reliable in use, which assists in a positive sense in meeting redundancy requirements and, which as a consequence of the foregoing, may be employed in favor of mass balance. The need further exists to provide such a system which may be easily tested to ascertain its proper functioning without the need to resort to elaborate techniques, and without costly removal and replacement to effect the testing.

SUMMARY OF THE INVENTION

The present invention advantageously provides a limited lock device which yields a stiff link with a control surface of an aircraft in the event of actuator failure and, thereby, provides flutter constraint therefor. The control surface lock of the present invention allows for the removal of mass balance while maintaining redundancy requirements yielding the further advantage of considerable weight savings while providing good dynamic response characteristics in conjunction with flutter control. The control lock of the present invention is also very desirable insofar as it allows for back-driving response in events where hydraulic failures impair only an associated actuator for the control surface leaving a second, backup actuator operational. Yet another advantage is the ability of the system to be tested without the need to resort to elaborate techniques in order to insure proper functioning thereof.

The foregoing, and other, advantages of the present invention are provided by a control surface lock for flutter constraint in cooperative combination with an hydraulic actuator for the control surface, wherein system pressure on the actuator maintains the lock in a dynamic, bypassed configuration while loss of the system pressure causes the lock to assume a constraint configuration. In one aspect of the invention, the lock comprises a locking piston secured to the control surface and disposed for reciprocable movement in a locking cylinder upon actuation of the surface, along with first and second charged locking chambers disposed for series flow of fluid from one to the other on movement of the piston. This series flow is through a bypass valve means, biased to an open position by system pressure, and flow splitter means; the latter also having a parallel flow path from the actuator which provides necessary make up fluid and fluid exchange. Loss of system pressure removes the biasing force maintaining the bypass valve in an open position, interrupts the series flow between chambers and effectively locks the piston in a constraint configuration. During dynamic operating conditions, fluid from the actuator is exchanged in the flow splitter with fluid in the locking chambers to prevent silting or stagnation which might otherwise contribute to potential problems. In a highly preferred embodiment, the control surface lock is aligned for dependent operation with a first hydraulic actuator but for semi-independent operation with a second actuator for manipulative movement of the same control surface. Thus, the lock further preferably comprises relief valve means allowing for a parallel flow path for fluid between the locking chambers upon the application of an external threshold force to the control surface by the second actuator when the first actuator has failed and the lock has assumed its constraint configuration. The lock may be back driven in this way by the second actuator but nonetheless maintain a rigid or stiff link in the event of system failure.

In a highly preferred, exemplary embodiment, the control surface lock of the present invention is integrated with an hydraulic actuator, the latter comprising an hydraulic supply having pressure and return lines, a control piston means secured to the control surface, responsive to a control input for reciprocable movement in a control piston cylinder and slaved movement of the control surface. The control piston cylinder includes first and second control chambers receiving and porting fluid upon movement of the control piston. Control valve means provide fluid communication between the pressure line and the respective one of the control chambers receiving fluid and between the return side of the actuator and the control chamber porting fluid. In this aspect of the invention, the control surface lock is disposed intermediate the return side of the actuator and the system return line. Under normal operation, fluid ported from the control piston chamber is routed through the control valve in the actuator and an accumulator to a flow splitter in the lock. The flow splitter has one path disposed in series through an accumulator to the return side of the hydraulic system. A second path is the one noted above between the two chambers in the locking cylinder. Consequently, fluid from the actuator is intermixed with fluid ported and received in the locking cylinder to avoid silting as aforementioned.

The foregoing, and other advantages of the present invention will become more apparent, and a fuller appreciation of the sturcture and mode of operation thereof will be gained, upon an examination of the following detailed description of the invention taken in conjunction with the single FIGURE of drawing.

BRIEF DESCRIPTION OF THE DRAWING

The drawing is a schematic diagram of a control surface lock in accordance with the present invention, shown associated in a highly preferred embodiment in dependence with an hydraulic actuator for the control surface.

DETAILED DESCRIPTION

Figure 1:
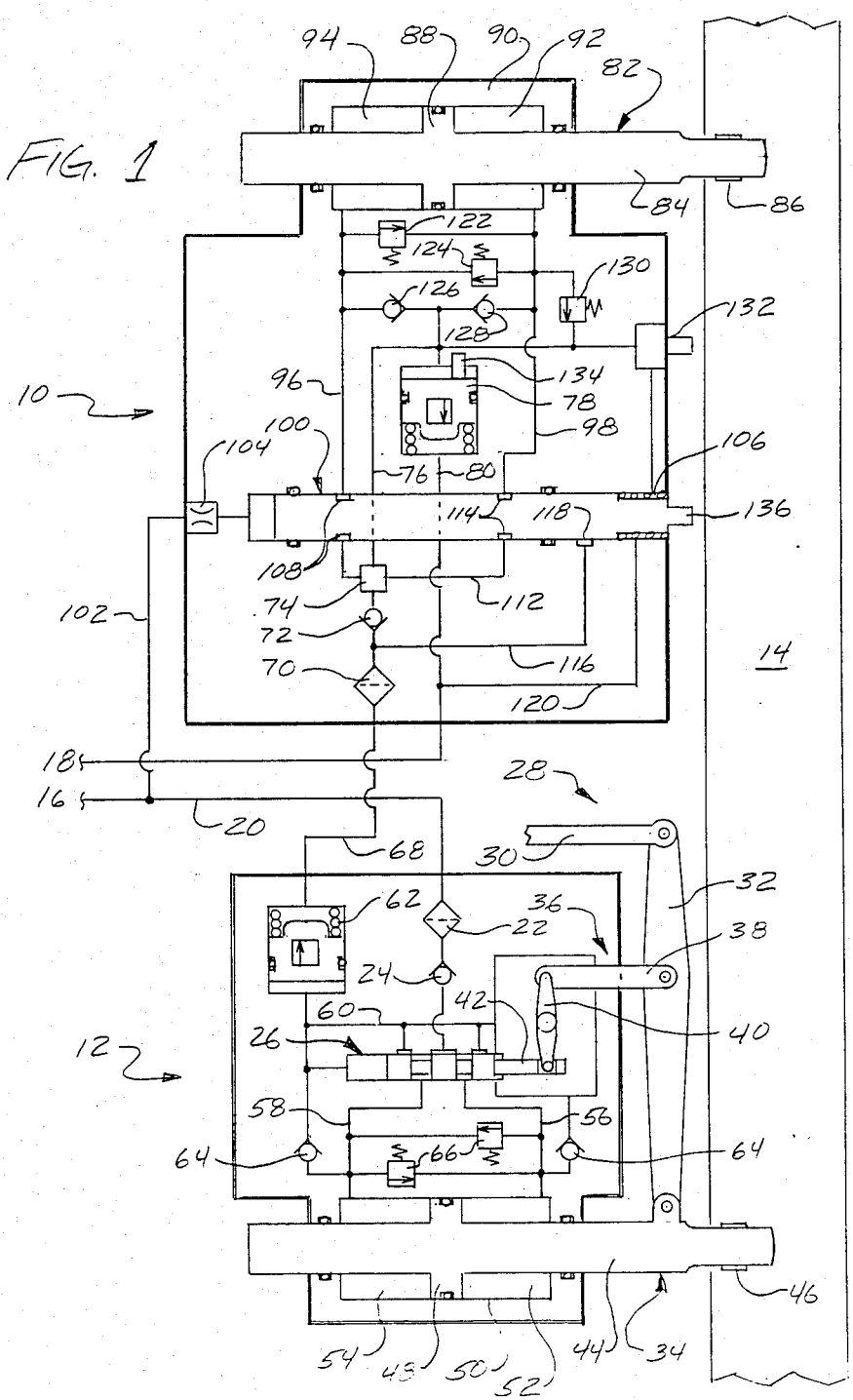

The present invention relates, generally, to devices for providing a rigid link to a control surface of an aircraft with an eye toward flutter constraint thereof in the event of system failure, while meeting FAR redundancy requirements. The control surface lock of the present invention is particularly adapted for cooperative combination with a first hydraulic actuator for movement of the control surface and with which it is dependent and also a second hydraulic actuator on the same control surface with which it is semi-independent in operation. Accordingly, the control surface lock of the present invention will now be described with reference to certain preferred embodiments within this context; although, those skilled in the art will appreciate that such a description is meant to be exemplary only and should not be deemed limitative—as it is equally well envisioned within the scope of the present invention to use the same type of structure in association with aircraft components other than control surfaces. Indeed, the structure and principles of the present invention are widely adaptable to numerous applications benefiting from the type of limited locking features provided hereby.

Turning to the sole FIGURE of drawing, a control surface lock in accordance with the present invention, designated generally as 10, is shown to be associated with an hydraulic actuator, designated generally as 12, for manipulation of an aircraft control surface, designated generally as 14, such as an elevator or rudder. Hydraulic pressure and return lines, 16 and 18 respectively, provide hydraulic fluid communication for operation of both the lock and actuator. The pressure line 16 thus include a first leg 20 providing upstream pressure for actuator 12, through a filter member 22 and check valve 24. This supplies pressurized fluid to a control valve 26 controlling the flow through the actuator as is required for manipulation of the control surface 14.

The control valve 26 is responsive to input through an actuator servo mechanism 28. The mechanism 28 includes a first control arm in operative communication with the cockpit of the aircraft at one end and a control linkage arm 32 at the other end. The linkage arm 32 engages an actuator piston means, designated generally as 34, at its distal end and a valve linkage assembly 36 intermediate the length thereof. The valve linkage assembly 36 is itself comprised of a first leg 38 pivotally attached to a second leg 40 secured directly at its distal end to a reciprocable stem 42 of the control valve 26 and pinned or otherwise secured for pivotal movement intermediate the length thereof.

The actuator piston means 34 is shown in the FIGURE to include a piston rod 44 secured to the control surface 14 at a fixture point 46 such that movement of the rod 44 will cause a corresponding movement in the control surface. The piston means 34 further includes a piston 48 disposed within an actuator cylinder 50 for reciprocable movement therein. As is generally conventional, the piston 48 divides the internal portion of cylinder 50 into first and second fluid chambers, 52 and 54 respectively.

Manipulation of the servo input 28 causes fluid flow in the actuator piston means 34 and corresponding movement of the control surface 14. For example, applying a mechanical input to arm 30 to the right will cause pivotal movement of the leg 38 to the right thereby pushing stem 42 to the left by virtue of the connection through leg 40. Fluid in the pressure line 20 applied to the control valve 26 will thus be admitted along a fluid line 56 to chamber 52 increasing the volume of fluid therein. The pressure head developed as a consequence forces piston 48 to the left reducing the capacity of chamber 54. This forces fluid from that chamber through fluid line 58 to the return side of control valve 26 which, having been displaced, communicates with a return line 60 for ultimate discharge from the actuator through a low pressure releif valve in an accumulator 62. More specifically, the accumulator 62 includes a spring mechanism and a low pressure releif valve, both of which oppose flow of fluid through the device. The releif valve is set to a higher pressure than that characteristic of the spring resistance; both of which are less than the pressure developed in the actuator piston means 34 during its operation. Consequently, during normal operation the pressure of the fluid in line 60 overcomes both of the opposing forces of the spring and valve within the accumulator permitting flow therethrough. However, in the event of a system failure, the spring member will create a back pressure maintaining the pressurization of the upstream components and providing necessary make up fluid. As the pressure relief valve is set for a higher pressure than the spring may exert, fluid cannot be transmitted across the accumulator in this mode. Returning to a consideration of the normal operating mode, concomitant with the porting of fluid, movement of the piston 48 causes manipulation of the control surface 14 through the attachment of piston rod 44 thereto. As the incremental advancement of the control surface 14 responds to the input on arm 30, the stem 42 is returned to a neutral position and fluid flow terminates. The actuator 12 also includes check valves 64 and pressure relief valves 66 for controlling fluid flow throughout the circuitry under both normal and failure conditions. In combination with the accumulator 62, the actuator remains suitably pressurized in the absence of system pressure and make up fluid is provided to the cylinder as need be. Hence the actuator provides one path of control surface constraint in the event of hydraulic system failure—another means of redundancy to complement the actuators.

The return side of actuator 12, from the accumulator 62, communicates with the hydromechanical lock 10 through fluid line 68. Fluid ported from the cylinder 50, via either chamber 52 or 54 depending upon the movement of the actuator, flows through the line 68, a filter 70 and check valve 72 to a flow splitter 74. The flow splitter 74 includes a first fluid leg 76 communicating with the input side of an accumulator 78 which embodies a low pressure releif valve/spring assembly (as with accumulator 62) having a discharge line 80 leading to the return 18. Thus, all other things being equal, an equal amount of fluid ported from the actuator 12 flows through this fluid circuit to return.

The lock 10 includes a locking piston means designated generally as 82. Locking piston means 82 is itself comprised of a piston rod 84 attached to the control surface for movement therewith about a fixture point 86. As the actuator 12 causes movement of the control surface as noted in general above, that movement will thereby be coupled to the piston rod 84 causing translation thereof. The locking piston means further includes a piston 88 disposed for reciprocable movement within a locking cylinder 90. The piston 88 thus defines first and second chambers 92 and 94, respectively, which receive and discharge fluid within the cylinder 90 in response to motion of the piston 88. For purposes of the present discussion, following the explanation of the fluid path for the actuator 12, movement of the actuator piston means 34 to the left in the FIGURE translates an equivalent motion of the locking piston means 82 to the left. Thus, fluid must be ported from the chamber 94 and supplied to the chamber 92 as the piston 88 is displaced in the cylinder. Under these circumstances, the ported fluid will be discharged through a first line 96 and supplied to the other side of the cylinder via a second line 98 as described immediately below.

A biased bypass valve designated generally as 100 is interposed between the two fluid lines 96 and 98. The valve is biased into a normally open position by communication through line 102 to the pressure side of the hydraulic system via orifice 104. The valve includes a spring 106 or like biasing member urging it toward a normally closed configuration but successfully opposed by pressure in line 16. In this normal position, fluid line 96 communicates across registering ports 108 and through line 110 to the flow splitter 74. Fluid emanates from the flow splitter along line 112 to ports 114, likewise in registration when the bypass valve 100 is in this configuration. Accordingly, fluid ported from chamber 94 freely flows through line 96, the bypass valve, the flow splitter, returning through the bypass valve to line 98 and into chamber 92. By virtue of the three-way flow splitter 74, fluid exchange occurs between that discharged from the actuator 12 and that circulating through the lock 10, thus forcing fresh fluid into the lock circuit, preventing stagnation and/or any silting in the latter.

The locking piston means 82 is free for reciprocation in response to movement of the control surface 14 as manipulated via the actuator 12. Fluid circulates and exchanges freely through the flow splitter, the quantity required within cylinder 90 being maintained and the amount ultimately required for discharge along return line 18 likewise flowing in an unimpeded fashion. Thus, it can be seen that a series flow path is established from the discharging chamber of cylinder 90, through the bypass valve and flow splitter (itself having a parallel flow path for exchange purposes as noted above), through the valve again to the receiving chamber of the cylinder 90. Loss of system pressure alters this free interexchange, however; and in several significant ways.

Immediately upon a pressure failure, the biasing spring 106 shifts bypass valve to a locking configuration. The ports 108 and 114 no longer register across the valve and flow between chambers 92 and 94 is interrupted. The inability to port fluid effectively locks piston 88 within the cylinder 90; providing in turn a necessary redundant means of effectively locking the control surface for constraining flutter which might otherwise occur due to concomitant loss of the hydraulics in the actuator 12 and failure of all other flutter protection means. At the same time, the pressure drop is experienced at the juncture between filter 70 and valve 72, that point being vented along line 116 to a port 118 on bypass valve 100. With the valve 100 now in its locking configuration, port 118 communicates through the valve with a line 120 leading to return 18. This frees line 68 by dumping pressure to return in order to permit the accumulator 62 to operate. Otherwise, there is the possibility that the spring in the accumulator would be incapable of operating against the vacuum developed above the device; a situation even more likely to occur should the system experience cooling and fluid contraction.

Under virtually all operating conditions important within the aircraft context of the control surface lock 10, there will be an independent actuator in addition to actuator 12. That actuator, not shown in the FIGURE, will have its own independent hydraulic system. In the event that hydraulic failures occur on both of these actuators, the locking piston means 84 will provide a stiff link with control surface 14 protecting against flutter. However, it may well be that the second actuator remains operable and could thereby provide required manipulation of the control surface notwithstanding failure respecting the actuator 12. Accordingly, first and second pressure relief valves 122 and 124, respectively, provide opposed parallel flow paths across the cylinder 90. These pressure releif valves allow the locking piston means 82 to be back driven notwithstanding the closure of bypass valve 100. For example, the pressure relief valves 122 and 124 can be set to resist pressure below a certain threshold determined to be effective for flutter constraint (e.g., 500 psi) and yet allow flow should pressure exceed that threshold. With the second actuator operable, these forces can be balanced so that it will be able to override the lock 10 (e.g., by applying force exceeding 500 psi). Accordingly, should the second actuator manipulate the control surface 14 against the resistance of piston 88, attempting to drive it to the left, once the threshold force value had been reached then fluid from chamber 94 would be permitted to pass through relief valve 122 along this parallel line and thence be admitted to chamber 92; vice versa through pressure relief valve 124 if movement is in the opposite direction.

During times of supply pressure failure requiring the rigid link to the control surface 14 afforded by the lock 10, it is essential that the chambers 92 and 94 remain full lest the stiffness of locking piston means 82 be lost. And, this is true whether or not the piston is being overdriven by an additional actuator. Accordingly, first and second charging check valves 126 and 128, respectively, are provided in order to permit the accumulator 78 to provide make-up fluid into the locking piston should its supply pressure drop. Further improvements on operational efficiency are achieved by the inclusion of a thermal relief valve 130 accounting for expansion of fluid upon increase in temperature.

A very desirable feature of the lock 10 of the present invention is its ability to be subjected to a simple yet reliable testing procedure. This ability is provided, in part, by a accumulator test valve 132, a accumulator indicator 134 and a bypass indicator 136. The accumulator test valve 132 is disposed across the accumulator 86 as a parallel flow path to return. During operation, the accumulator maintains pressurization of the locking piston through the charging check valves but, when the accumulator test valve is actuated, that pressure will be dumped and shown visually by the accumulator indicator 134. A simple test procedure for the system is thus made available. First, with system pressure on, the bypass indicator and accumulator indicator will provide visual information about the status of the respective bypass valve and accumulator. System pressure may then be turned off to test the characteristics of the system in a failure mode. Depending upon the aircraft, the weight of an average man applied to the control surface may be sufficient to back drive the locking piston; thereby providing a good check on the pressure relief valves 122 and 124. In situations requiring greater force, other suitable means of applying force might be used to achieve this aim; such as using the second hydraulic actuator to drive against the lock, and measuring pressure required to override the lock to show it is controlling the surface. After it is assured that the system is functioning properly in this mode, the accumulator test valve may be activated to examine into the proper functioning of accumulator 78 by first dumping residual pressure across the accumulator and watching the indicator and then returning system pressure to normal.

As is now readily apparent from the foregoing description, the hydromechanical lock 10 is a very efficient and reliable flutter constraint device. In conjunction with the flutter constraint provided by the control actuators, redundancy requirements are met by virtue of the stiff link provided across the lock should system failure be experienced; insuring positive flutter constraint under such circumstances. However, where a second actuator remains necessarily operable, the device provides a limited locking feature as the same may be back driven by the other actuator in that event. The control surface lock of the present invention also has the very distinct advantage of a straightforward, simple design which embodies many of the identical features of the associated actuators, and which can be implemented in a lightweight configuration; obviating the problems associated with complex designs (which perhaps are more sensitive to failures themselves) and eliminating the significant weight penalties associated with yet other options.

While principally destined as a flutter constraint lock for a control surface on an aircraft, the same structure might be used to good advantage in many other situations where limited locking features are desirable or advantageous; whether in the context of an aircraft or otherwise. Accordingly, while the invention has now been described with reference to certain preferred embodiments, modes of operation, and intended applications, those skilled in the art will appreciate that various substitutions, modifications, changes, and omissions may be made without departing from the spirit thereof. Thus, it is intended that the scope of the present invention be limited solely by that of the claims granted herein.

I claim:

1. A control surface lock for flutter constraint of a control surface of an aircraft in cooperative combination with an hydraulic actuator therefor, wherein system pressure on said actuator maintains said lock in a dynamic bypassed configuration and loss of system pressure causes said lock to assume a constraint configuration providing a stiff link with said control surface, comprising a locking piston secured to said control surface and disposed for reciprocable movement in a locking cylinder upon actuation of said surface; first and second charged locking chambers in said cylinder, disposed for series flow of fluid from one to the other upon movement of said locking piston through bypass valve means biased to an open position and flow splitter means having a parallel flow path from said actuator for fluid exchange; wherein loss of system pressure interrupts said series flow and locks said piston in said constraint configuration for flutter protection of said control surface.

2. The control surface lock of claim 1, wherein said bypass valve is biased to said open position by said system pressure.

3. The control surface lock of claim 2, further comprising relief valve means providing parallel flow paths between said locking chambers upon the application of an external threshold force to said control surface when said lock is in said constraint configuration.

4. The control surface lock of claims 1, 2, or 3, further comprising accumulator means disposed downstream of said flow splitter along said parallel path therethrough and communicating with the return side of the hydraulic supply system.

5. In combination with an hydraulic actuator for a control surface of an aircraft, comprising:
   i. an hydraulic supply having pressure and return lines;
   ii. control piston means secured to said control surface, responsive to a control input for reciprocable movement in a control piston cylinder and slaved movement of said control surface;
   iii. first and second control chambers receiving and porting fluid upon movement of said control piston; and,
   iv. control valve means for providing fluid communication between said pressure line and the respective one of said control chambers receiving said fluid and between the return side of said actuator and the control chamber porting said fluid;

a control surface lock for flutter constraint in the event of failure of said hydraulic supply, disposed intermediate said return side of said actuator and said return line, said lock comprising:
   a. locking piston means reciprocable in a locking cylinder means and slaved to said control surface for movement therewith;
   b. first and second charged locking chambers, respectively receiving and porting fluid upon movement of said locking piston means;
   c. biased bypass valve means having ports in series fluid flow intermediate said first and second locking chambers, operable between a normally biased, open position allowing flow and a closed position blocking flow; and,
   d. flow splitter means having a first fluid path from the return side of said actuator and communicating with said return line and a second fluid path, crossing said first fluid path, in series flow intermediate said first and second locking chambers, whereby fluid ported from said actuator and fluid ported from said locking cylinder means may exchange in said flow splitter means.

6. The combination of claim 5, wherein said control surface lock further comprises first and second relief valve means disposed in respective parallel flow paths between said first and second locking chambers, providing an alternate flow path therebetween upon the application of an external threshold force on said control surface when said bypass valve is in said closed position.

7. The combination of claim 6, wherein said bypass valve is biased into said open position by said hydraulic supply pressure against a counter-acting biasing means urging said bypass valve to said closed position.

8. The combination of claim 6, wherein said control surface lock further comprises accumulator means disposed in series flow in said first fluid path intermediate said flow splitter means and said return line, for maintaining pressure within said locking cylinder upon loss of said hydraulic supply.

9. The combination of claim 8, wherein said control surface lock further comprises first and second unidirectional flow paths to said first and second locking chambers, respectively, from the pressure side of said accumulator means.

10. A hydromechanical lock adapted for flutter constraint redundancy in the restraint of an aircraft control surface, comprising an hydraulic cylinder receiving reciprocable piston means disposed intermediate first and second charged chambers and in operative communication with an hydraulically-actuated surface to be locked upon loss of hydraulic pressure; biased bypass valve means having first and second sets of flow ports each disposed in registration for series flow of fluid between said first and second chambers respectively, said bypass valve means being biased for registration of said flow ports by said hydraulic pressure; flow splitter means having a first flow path in said series flow between said chambers and a second, fluid-interchanging, parallel flow path in communication with hydraulic return; wherein loss of said hydraulic pressure removes open biasing on said bypass valve means, interrupts said series flow and locks said piston means and associated surface to be locked.

11. The hydromechanical lock of claim 10, further comprising first and second unidirectional, restricted flow paths in opposed parallel legs bridging said first and second chambers in opposite directions operable to permit flow therebetween upon the application of a pressure in excess of a threshold.

12. The hydromechanical lock of claim 11, wherein each of said restricted flow paths includes a pressure relief valve adjusted to permit flow when pressure thereacrosss exceeds said threshold.

13. The hydromechanical lock of claim 12, further comprising accumulator means disposed in said second flow path of said flow splitter means downstream thereof and intermediate said hydraulic return, said accumulator means having a pressure side in unidirectional communication along separate flow paths with each of said first and second chambers for maintaining same in a charged condition.

14. The hydromechanical lock of claim 13, further comprising accumulator bypass valve means disposed in a normally closed configuration in a parallel flow path across said accumulator means between said pressure side thereof and in communication with said hydraulic return.

15. The hydromechanical lock of claims 10, 11, 12, 13 or 14, wherein said second flow path through said flow splitter means is a series flow path between the return side of an hydraulic actuator for said surface and said hydraulic return.

* * * * *